United States Patent [19]

Miller

[11] 4,232,708
[45] Nov. 11, 1980

[54] FLUID CONTROLLER

[75] Inventor: Laurence L. Miller, West Lafayette, Ind.

[73] Assignee: TRW Inc., Cleveland, Ohio

[21] Appl. No.: 51,795

[22] Filed: Jun. 25, 1979

[51] Int. Cl.³ .................... F15B 13/04; F15B 13/10; F15B 13/14
[52] U.S. Cl. ................... 137/625.21; 60/384; 91/467; 137/596; 180/132; 417/61 B
[58] Field of Search ............. 60/384; 91/467; 180/132; 137/596, 625.21; 418/61 B

[56] References Cited

U.S. PATENT DOCUMENTS

| | | | |
|---|---|---|---|
| 3,289,542 | 12/1966 | Fikse . | |
| 3,423,934 | 1/1969 | Mercier | 60/384 |
| 3,834,278 | 9/1974 | Goff et al. | |
| 3,895,888 | 7/1975 | Roberts . | |
| 4,050,474 | 9/1977 | Morgan . | |
| 4,069,743 | 1/1978 | Bertanza . | |
| 4,159,723 | 7/1979 | Baatrup et al. | 60/384 X |

Primary Examiner—Gerald A. Michalsky

[57] ABSTRACT

A controller for controlling fluid flow from a source to a motor, such as the steering motor of a motor vehicle. The controller includes a metering section and a control valve section comprising a stacked assembly of plate valve members which control flow and, along with the metering section, define the outer periphery of the controller, and minimize the need for complex cast housing members. The controller is compact and yet is constructed to respond to an input signal from an input shaft to direct needed flow from the source to the primary steering motor, and excess flow to an auxiliary motor. The controller is also characterized by a unique spring centering mechanism which applies a spring centering force to the assembly of plate valve members. Additionally, the controller is characterized by a special seal arrangement for resisting leakage of high pressure fluid about the input shaft, and by structure for forming pressure dams to resisting leakage of metered fluid.

17 Claims, 19 Drawing Figures

FIG.18

FLUID CONTROLLER

FIELD OF THE INVENTION

This invention relates to a fluid controller which includes a metering section and a control valve section, and which responds to rotation of an input shaft to meter fluid flow from a source to a motor such as the steering motor of a vehicle. It relates particularly to a controller in which the valve section is formed by a stacked assembly of plate valves which control fluid flow and which, along with the metering section, also form the outer periphery of the controller, and minimize the need for complex, heavy cast housing parts. Further, it relates to a controller which is compact, and which meters needed flow to a primary steering motor, and directs excess flow to an auxiliary motor. Additionally, it relates to a controller characterized by unique structure for providing a spring centering force for biasing the controller to a neutral condition, for forming pressure dams to minimize leakage of metered fluid, and for sealing the input shaft against leakage of fluid.

BACKGROUND OF THE INVENTION

Steering controllers are well known for controlling fluid flow to operate the power steering systems of off the road vehicles such as trucks, farm tractors, farm combines, and end loaders, etc. Such controllers are typically designed to meter flow from a source (e.g., the power steering pump) and direct the metered flow to power the vehicle steering motor.

In steering controllers known as integral controllers a control valve section and a metering section are disposed within a housing which is usually formed by one or more cast iron housing members. In the absence of steering effort, the control valve section is in a neutral condition in which no flow is directed to the steering motor. In response to operation of an input shaft connected with the vehicle steering wheel, the control valve section is moved away from the neutral condition into an operating condition in which the valve section directs flow from the source to the metering section, and directs metered flow from the metering section to the steering motor. When operation of the steering wheel ceases, the control valve section is returned to the neutral condition.

U.S. Pat. No. 3,895,888 discloses one such controller. The controller includes a metering mechanism formed by the intermeshing teeth of a pair of gerotor gear members having relative orbital and rotational movement. An input shaft is fixedly coupled with one gerotor gear member to rotate one of the gerotor gear members therewith. The other gerotor gear member is coupled with a rotatable control valve element and, in response to rotation of the one gerotor gear member, effects rotation of the control valve element by a limited extent from a neutral condition to place the controller in an operating condition. At FIGS. 14–16 the patent discloses a controller in which the control valve includes a rotatable plate valve and provides a very compact structure.

Some steering controllers have also been designed so as to be capable of not only metering needed flow to the steering motor, but also directing excess flow to an auxiliary motor associated with equipment such as backhoes, lifting devices, etc. carried by the vehicle. U.S. Pat. Nos. 3,834,278 and 4,050,474 disclose such types of controllers. In U.S. Pat. No. 3,834,278 an axially movable valve element controls flow from a source in response to rotation of an input shaft connected with the vehicle steering wheel. When the controller is in a neutral condition, all flow from the source is directed to the auxiliary motor. When the controller is placed in an operating condition, needed flow to the steering motor is metered and directed to the steering motor, and excess flow is directed to the auxiliary motor. In U.S. Pat. No. 4,050,474 a control valve comprises a pair or rotatable valve members coupled together by a lost motion connection. One valve element is fixed with the input shaft and the other valve element is connected with one of a pair of gerotor gear elements forming the metering section.

The controller of each of the foregoing patents includes a fairly large, complex cast housing member. In the controllers of U.S. Pat. Nos. 3,834,278 and 4,050,474 the cast housing members enclose the valve section and also include parts of the flow control passages. In U.S. Pat. No. 3,895,888, a cast housing member encloses the metering section and the rotatable plate valve member, and also forms an opening shaped to receive the bearings and seals which support and seal the input shaft. To form such cast housing members properly usually requires a number of precise machining steps. Also, the cast members are usually bulky, and, being cast of iron, constitute a significant portion of the overall weight of the controller.

The controller disclosed in each of the foregoing patents also includes a spring centering mechanism which biases the control valve toward a neutral condition. Rotation of the input shaft actuates the valve element against the bias of the spring centering mechanism. In U.S. Pat. No. 3,895,888 (FIGS. 14–16) the spring centering mechanism includes a spherically shaped detent which is spring biased in a radial direction into a V-shaped groove in the rotatable plate valve member. In U.S. Pat. No. 3,834,278 the spring centering mechanism comprises a torsion rod disposed on a bore within the axially movable valve member. The torsion rod is twisted or wound by movement of the valve member away from neutral, and unwinds to urge the valve member to the neutral condition when steering effort ceases. In U.S. Pat. No. 4,050,474 the spring centering mechanism comprises a series of leaf springs compressed against the housing and against the relatively rotatable valve members.

The controller of U.S. Pat. No. 3,834,278 also has pressure dams for blocking leakage of metered fluid to a low pressure return port when the controller is in an operating condition. Pressure dam grooves are disposed between grooves at metered fluid pressure and at return pressure. In neutral, inlet fluid pressure, which is close to metered fluid pressure, is communicated with the pressure dam grooves. When the controller is in an operating condition only one pressure dam groove is needed to block leakage of metered fluid to return. The other pressure dam groove forms part of a flow passage directing flow from the motor to a reservoir. In such controllers a check valve or a specially designed orifice is usually used to minimize flow from the pump through whichever pressure dam groove is in the latter condition.

In U.S. patent application Ser. No. 944,703, a controller is disclosed in which pressure dams are formed in a different manner. Specifically, in neutral there is communication between the pump and the reservoir through the pressure dam grooves. Check valves are used to minimize flow through the pressure dam grooves in this condition. Pressure dams are created by relative movement of a pair of valve members to an operating condition in which they block flow through the pressure dam grooves.

The controller of U.S. Pat. No. 3,834,278 also shows a typical dynamic seal arrangement for minimizing leakage of high pressure fluid about the input shaft. A specially formed bore in the housing encircles the input shaft, and an arrangement of elements forming a dynamic seal are disposed between the bore in the housing and the rotatable input shaft.

SUMMARY OF THE INVENTION

The present invention provides a compact integral steering controller having a metering section, and a valve section which is formed by a stacked assembly of plate valves, in accordance with the broad concept of U.S. Pat. No. 3,895,888, and which also improves upon the controller disclosed therein in several important aspects.

One improvement is that the construction of the controller of the invention minimizes the use of complex cast housing parts, which add considerably to the weight of a controller and which often require a number of precise machining steps to manufacture. The controller includes a metering section and a control valve section disposed between a pair of end plates. An input shaft extends through one of the end plates to provide an input signal for operating the controller. In the control valve section a unique stacked assembly of plate valves not only controls flow but also defines a part of the outer periphery of the controller, thereby eliminating cast housing parts in the valve section. The metering section includes a gerotor type metering mechanism disposed within a thin tubular shell which, along with the end plates, defines the remainder of the outer periphery of the controller. The thin tubular shell, which in the preferred embodiment is the only cast housing piece in the controller, is relatively simple in shape and is relatively light in weight in comparison to cast housing pieces which have been suggested for previous controllers.

Another improvement of the controller of the present invention is that it is very compact, and yet is designed to both meter needed flow to the steering motor and direct excess flow to an auxiliary motor. The stacked assembly of plate valves forming the control valve section is constructed such that when the control valve section is in neutral all flow is directed to the auxiliary motor, and communication between the source and the metering section is blocked. In response to rotation of the steering wheel, flow is metered and directed to the steering motor, and flow to the auxiliary motor is gradually restricted as a function of the extent of movement of the control valve section away from its neutral condition.

A further improvement of the controller of the invention is the spring centering mechanism which biases the control valve section to a neutral condition. The control valve section preferably comprises a rotatable plate valve member disposed between a pair of plate valve members which are fixed in the controller. The rotatable plate valve member includes one or more arcuate slots each of which is aligned with an arcuate slot in one of the adjacent fixed plate valve members. One or more helical springs are each disposed partially in an arcuate slot in the rotatable plate valve member. Each such helical spring is also disposed in, and compressed in, the aligned arcuate slot in the one of the fixed plate valve members. At least one such helical spring is also compressed in the arcuate slot in the rotatable plate valve member to exert a centering force on the rotatable plate valve member to bias the plate valve member to the neutral condition. Each spring is compressed further by a predetermined amount of rotation of the rotatable plate valve member away from the neutral condition. By varying the length of the aligned slots the spring centering force exerted at predetermined amounts of relative rotation of the plate valve members can be precisely controlled.

Still another improvement of the controller of the invention resides in simply formed structure which creates a pressure dam for resisting leakage of metered fluid to return when the rotatable plate valve member is moved away from the neutral condition and to an operating condition. The fixed and rotatable plate valve members have end surfaces in abutting, sliding relationship with each other. A pressure dam groove is formed in the end surface of one of the relatively movable plate valve members. When the plate valve members are in the neutral condition the pressure dam is communicated with a return port, but the plate valves cooperate to block flow from the inlet port through the pressure dam groove to the return port. In response to relative movement of the plate valve members to an operating condition the pressure dam groove is disposed between a flow path containing metered fluid and a flow path containing low pressure return fluid. The abutting end surfaces of the relatively movable plate valve members cooperate such that in response to movement of the plate valve members to an operating condition a static body of fluid is created in the pressure dam groove. Pressure from the inlet port is communicated with the pressure dam groove to bring the pressure in the pressure dam groove to inlet pressure, which is close to the pressure of the metered fluid. The pressure dam groove is simply formed and without the use of a valve or an orifice to block flow therethrough, because neither in neutral nor in an operating condition is the pressure port expected to communicate with the return port through the pressure dam groove.

Yet another feature of the present invention resides in the structure for sealing the input shaft against leakage of high pressure fluid. The input shaft extends through one of the end plates of the controller and is connected for joint rotation with a drive plate having a radial surface which is in facing relation with an interior surface of the end plate. Sealing is effected by a special arrangement of elements surrounding the input shaft and disposed between the facing surfaces of the drive member and the interior surface of the end plate. The elements include a sealing ring of resilient compressible material encircling the input shaft and being compressed between the facing surfaces of the drive plate and the end plate, a thrust bearing circumscribing the sealing ring for setting a minimum spacing between the facing surfaces and for taking up axial forces, and a spacer ring between the sealing ring and the input shaft for preventing radial extrusion of the sealing ring. This seal arrangement may be simpler to construct than previous types of input shaft seals, because it does not require specially formed grooves in a housing to support the sealing elements. Yet, it is believed to provide effective sealing against leakage of fluid.

BRIEF DESCRIPTION OF THE DRAWINGS

Further features and advantages of the invention will become apparent from the following detailed description and the accompanying drawings wherein.

DETAILED DESCRIPTION OF THE PREFERRED EMBODIMENT

Figure 1:
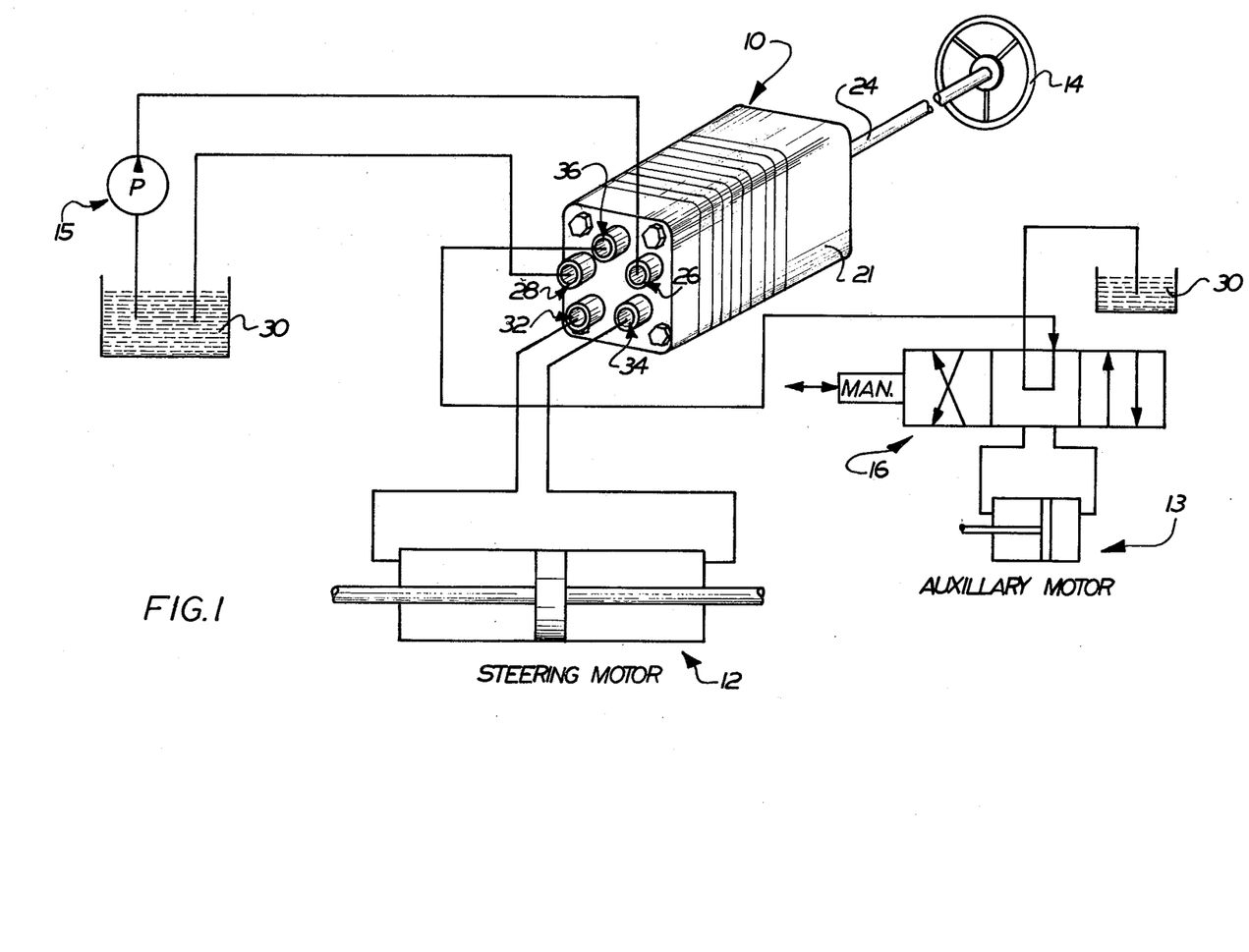
FIG. 1 is a schematic representation of a fluid system having a controller according to the invention for controlling fluid flow to a steering motor and an auxiliary motor.

As discussed above, in addition to having a number of improved structural features, a controller according to the invention is also designed to meter flow from a source to a primary motor, such as the steering motor of a vehicle, and to direct excess flow to an auxiliary motor for operating additional equipment carried by the vehicle. FIG. 1 shows a controller 10 according to the invention in a hydraulic system including a steering motor 12 and an auxiliary motor 13. The controller 10 is operated by an input signal from a vehicle steering wheel 14, and directs flow from a pump 15 to the vehicle steering motor 12 and to the auxiliary motor 13.

As is known, the amount of flow needed for steering may vary, depending upon factors such as the rate of movement of steering wheel 14, the amount of turning desired, etc. The controller 10 assures that as much of the output of the pump 15 as is needed for steering is metered and directed to the steering motor 12. Excess flow from the pump, i.e., flow beyond that needed for steering, is directed to the auxiliary motor 13 (under the further control of a manually operated valve 16). When no steering is taking place, the controller 10 is in a neutral condition in which it directs all of the flow from pump 15 to the auxiliary motor 13.

Figure 2:
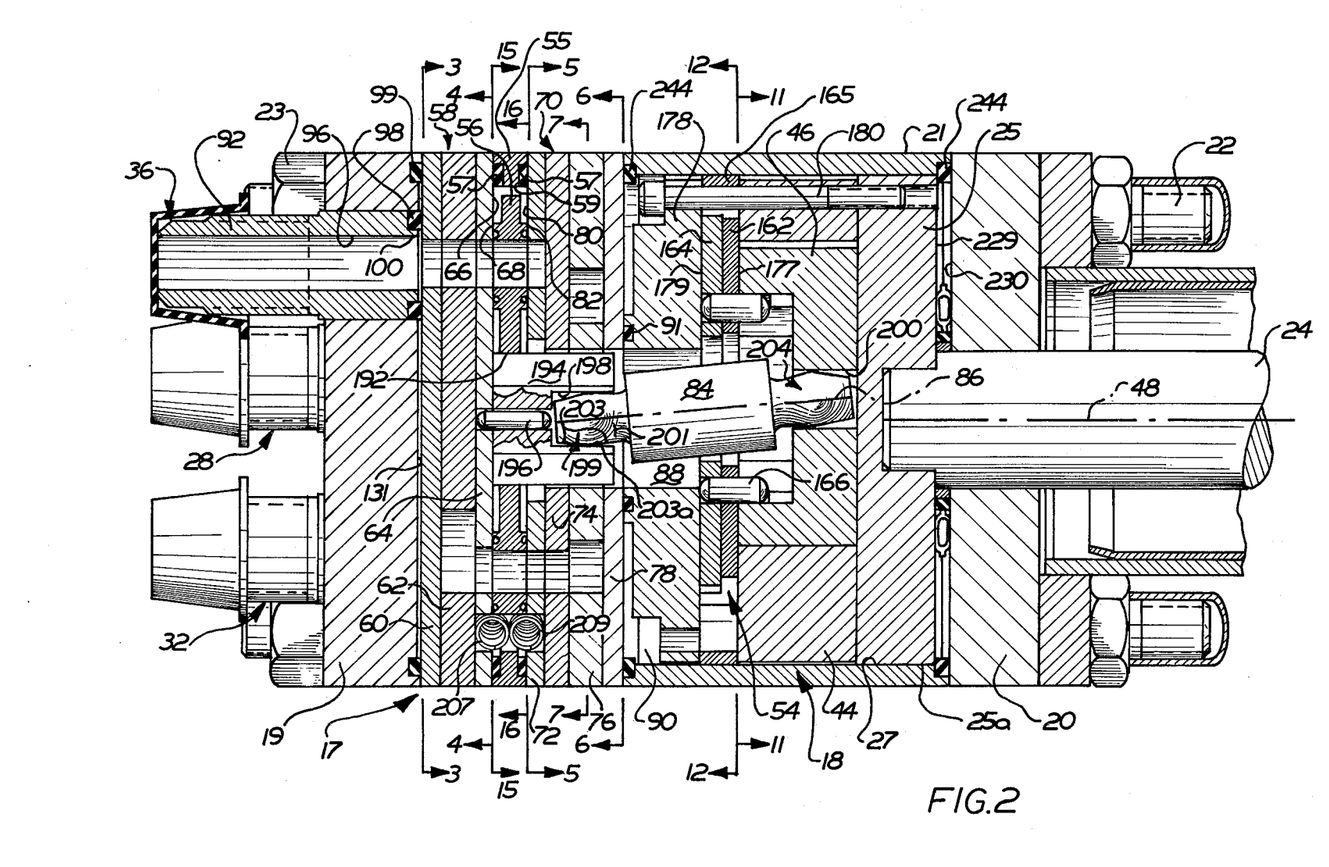
FIG. 2 is a longitudinal sectional view of the controller of FIG. 1.

Referring to FIG. 2, the controller 10 includes a valve section 17 and a metering section 18 disposed between a pair of end plates 19, 20. The valve section 17 includes a stacked assembly of plate valves disposed adjacent end plate 19. The metering section 18 includes a gerotor gear type metering mechanism disposed within a thin cylindrical tubular shell 21. The assembly of valve plates, and the cylindrical tubular shell 21 are clamped between the end plates 19, 20 by means of a series of bolts 22 which extend through the plate valves and the end plates 19, 20 and are locked in place by respective nuts 23.

An input shaft 24 connected with the steering wheel 14 extends through the end plate 20. The input shaft 24 is coupled for joint rotation with a drive plate 25 which is disposed within the tubular shell 21. The drive plate 25 has a cylindrical outer surface 25a which is rotatably supported on the cylindrical inner surface 27 of the tubular shell 21. Rotation of the input shaft 24 and the drive plate 25 transmits the input signal from the steering wheel 14 to operate the elements of the controller as described more fully hereinafter.

The end plate 19 includes an inlet port 26 connected with the pump 15, a return port 28 connected with a reservoir 30, a pair of cylinder ports 32, 34 connected with opposite chambers of the steering motor 12, and an auxiliary port 36 connected with the auxiliary motor 13.

The valve section 17 controls flow between the various ports and the metering section 18. When no steering is taking place, the valve section 17 is biased to a neutral condition in which it directs flow from the inlet port 26 to the auxiliary port 36 and blocks communication of the inlet port 26 with the metering section 18. Rotation of the steering wheel 14 moves the valve section 17 away from the neutral condition and places the controller in an operating condition. When the valve section 17 is in an operating condition fluid from the inlet port 26 is metered and directed to one of the cylinder ports 32, 34 to pressurize the associated chamber of the steering motor 12. Flow returning from the contracting chamber of the steering motor is directed through the other cylinder port to the return port 28, which is connected with reservoir 30.

The need to direct a greater proportion of the output of the pump to the steering motor increases with movement of the valve section away from the neutral condition. During a steering maneuver, as the steering wheel 14 rotates the valve section 17 away from the neutral condition to direct metered flow to one cylinder port, flow to the auxiliary port 36 is gradually restricted as a function of the extent of movement of the valve section away from the neutral condition. Only excess flow, i.e., beyond that needed for steering, is directed to the auxiliary motor. If the steering wheel rotates the valve section far enough away from the neutral condition, such as during an extremely rapid steering maneuver, all flow from the pump 15 is directed to operate the steering motor 12, and flow to the auxiliary motor 13 is cut off.

Figure 11:
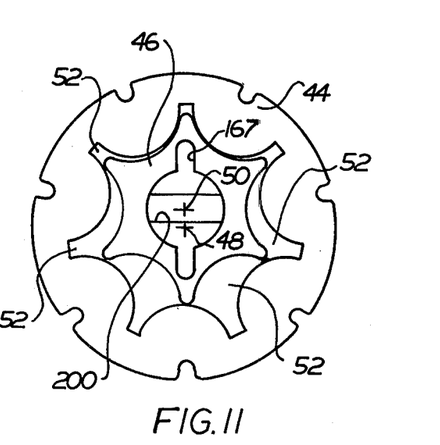
FIG. 11 is a view of one side of the gear set forming part of the metering section of the controller of FIG. 2, taken along the line 11—11 of FIG. 2, with certain portions omitted.

Referring to FIGS. 2 and 11, the metering section 18 includes a gerotor gear set having an outer gear member 44 with internal teeth and an inner gear member 46 with external teeth. The inner gear member 46 has one less tooth than the outer gear member 44. The outer gear member 44 is fixed to the drive plate 25 and rotates jointly with the drive plate 25 and the input shaft 24 about a common central axis 48. The inner gear member 46 has a central axis 50 which is eccentrically disposed with respect to the central axis 48. With this construction, the gear members 44, 46 are adapted for relative rotational and orbital movement, as will be readily recognized by those of ordinary skill in the art.

The intermeshing teeth of the gerotor gear members 44, 46 define expansible and contractable fluid pockets 52 (FIG. 11). As the gear members rotate and orbit relative to each other, some of the fluid pockets 52 are expanding while other fluid pockets are contracting. A commutation valve 54 (FIG. 12), described more fully hereinafter, controls flow to and from the expansible and contractable fluid pockets 52 in timed relation to the movement of the gerotor gear members.

As noted above, the control valve section 17 includes a stacked assembly of plate valve members fixed adjacent the end plate 17. The fixed plate valve members include a valve ring 55 sandwiched between a manifold plate valve 58 and an isolation plate valve 70. A pair of static seals 57 prevent fluid leakage between the valve ring 55, the manifold plate valve 58 and the isolation plate valve 70. The valve ring 55 includes a central opening 59 defining part of a chamber therein, and a rotatable plate valve member 56 is supported in that chamber for rotation about the central axis 48.

The manifold plate valve member 58 comprises three plates 60, 62 and 64 bonded together by copper brazing, and includes an end surface 66 abutting, and in relatively sliding engagement with, one end surface 68 of rotatable plate valve member 56. The isolation plate valve member 70 comprises four plates 72, 74, 76 and 78 bonded together by copper brazing and includes an end surface 80 abutting, and in relatively sliding engagement with, the other end surface 82 of the rotatable plate valve member 56.

A wobble shaft 84 having a central axis 86 disposed at an angle to the central axis 48 is adapted to rotate the plate valve member 56 jointly with the inner gerotor gear member 46. The wobble shaft 84 is also supported in such a manner that it can pivot relative to the gear member 46 and the plate valve member 56 to allow the inner gerotor gear member 46 to orbit with respect to the outer gerotor gear member 44.

The plate valve member 56 is spring biased to a neutral condition relative to fixed plate valve members 58 and 70, as described more fully hereinafter. In a neutral condition the plate valve members direct flow from the inlet port 26 to the auxiliary port 36. The plate valve members also isolate the inlet port 26 from the metering section 18 so that no flow is directed from the pump to the metering section 18. As the steering wheel 14 rotates the input shaft 24, torque is transmitted through the gerotor gear members 44, 46 to rotate the plate valve member 56 relative to the fixed plate valve members 58, 70 in order to move the plate valve member 56 away from the neutral condition and to place the valve section 17 in an operating condition.

A pair of chambers 88, 90 (separated by a sealing member 91) are disposed adjacent the metering section 18. When the valve section 17 is placed in an operating condition, the plate vlave members 56, 58 and 70 establish fluid communication between the inlet port 26 and one of the chambers 88, 90. The plate valve members also establish fluid communication between the other of chambers 88, 90 and one of the cylinder ports. the commutation valve 54 communicates the chambers 88, 90 with the fluid pockets formed by the gerotor gear members 44, 46 such that flow from the chamber 88 or 90 which is connected to inlet port 26 is directed to the fluid pockets which are expanding and flow from the fluid pockets which are contracting is directed to the other of chambers 88, 90 and thereby to the cylinder port which is being pressurized.

Flow is gradually restricted to the auxiliary port 36 as a function of the degree of movement of the plate valve member 56 away from the neutral condition. If the plate valve member 56 is moved far enough away from neutral (as during an extremely rapid steering maneuver) flow to the auxiliary port 36 is shut off, and all flow is metered and directed to the steering motor through one of the cylinder ports 32, 34.

The various ports are formed similarly to auxiliary port 36 which is shown in section in FIG. 2. The port 36 includes a tubular element 92 extending through an opening in the end plate 19. The tubular element 92 includes a central opening 96 defining a fluid passage which communicates with one side of the manifold plate valve member 58. A static sealing ring 98 surrounds the fluid passage 96. Similarly, each other port also comprises a tubular element extending through end plate 19 and defining a fluid passage surrounded by a static sealing ring.

As discussed above, the manifold plate valve member 58 includes three plates 60, 62, 64 which are bonded together by copper brazing. As seen in FIG. 2, the manifold plate valve member 58 includes end surface 100 which is adjacent the end plane 19, and end surface 66 which is adjacent the end surface 68 of the rotatable plate valve member 56. A static sealing ring 99 is disposed between end plant 19 and the manifold plate 58.

Figure 3:
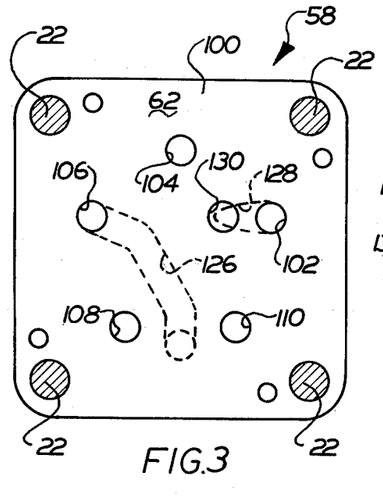
FIGS. 3 and 4 are views of opposite sides of a manifold plate valve member in the controller of FIG. 2, taken respectively along the lines 3—3 and 4—4 of FIG. 2.
Figure 4:
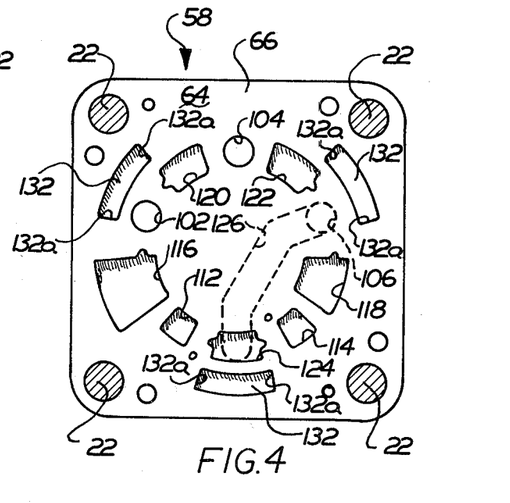

FIGS. 3 and 4 show the opposite sides of manifold plate valve member 58. Formed in the end surface 100 is an inlet passage 102, an auxiliary passage 104, a return passage 106, and a pair of cylinder passages 108, 110, all of which communicate with their respective ports. The inlet passage 102 and auxiliary passage 104 are each circular and extend axially through the plates 60, 62, 64. Each of the cylinder passages 108, 110 comprises a circular passage which extends through the plates 60, 62and communicates with a respective flat sided passage 114, 112 extending through plate 64 and forming a window in the end face 66. Further, a pair of passages 116, 118 extending through plate 64 form metering windows in the end surface 66 of the plate valve member 58. Additionally, another pair of passages 120, 122 extending through plate 64 form windows on opposite sides of the auxiliary passage 104.

A passage 124 extending through plate 64 forms a return window in the end face 66. The return window 124 communicates with the return passage 106 in plate 60 by means of a passage 126 formed in the intermediate plate 62. A tear drop-shaped passage 128 formed in the intermediate plate 62 communicates the inlet passage 102 with another passage 130 in the plate 60. This latter passage communicates inlet pressure with a recessed cavity 131 (FIG. 2) formed in the surface of end plate 19 adjacent the manifold plate valve member 58 in order to pressure balance the stacked assembly of plate valves forming the valve section 17.

As seen in FIG. 4 the plate 64 includes three circumferentially spaced arcuate slots 132 having radial end walls 132a. These slots are in the end surface 66 of the manifold plate valve member 58 which is adjacent the rotatable plate valve member 56. The arcuate slots 132 form part of the spring centering mechanism described hereinafter.

Referring to FIGS. 2, 5, 6 and 7 the isolation plate valve member 70 includes a series of four plates 72, 74, 76, 78 bonded together, also by copper brazing techniques. Plate 72 includes an end face 80 adjacent the rotatable plate valve member 56. Formed in end face 80 are auxiliary window 134, a pair of windows 136, 138 on opposite sides of auxiliary window 134, a return window 143, a pair of inlet windows 140, 142, and a pair of cylinder windows 144, 146. A passage 148 extending through plate 72 forms a metering window in end surface 80. A series of holes in plate 74, 76 and 80 form a passage 150 which extends through the plate valve member to its backside (see FIG. 6) and which communicates the metering window 148 with chamber 90. Another passage 154 in plate 72 forms a metering window in end surface 80. The metering window 154 includes a central opening in plate 72, which communicates the metering window 154 with a series of central openings in the plates 74, 76, 78 (one is shown at 156 in FIG. 6, and another at 205 in FIG. 7). These control openings communicate metering window 154 with chamber 88.

Figure 5:
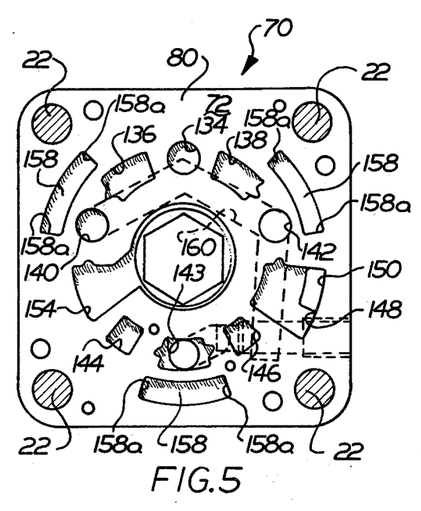
FIGS. 5 and 6 are views of opposite sides of an isolation plate valve member of the controller of FIG. 2, taken respectively along the lines 5—5 and 6—6 of FIG. 2.
Figure 6:
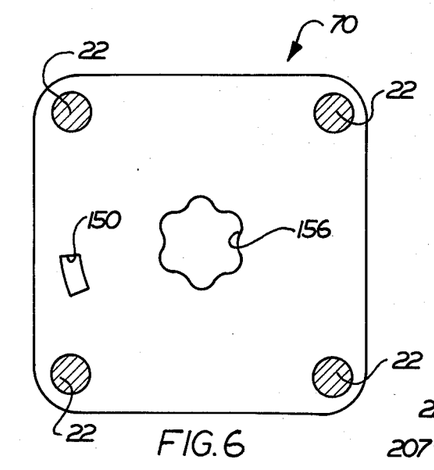

The plate 72 also includes three circumferentially spaced arcuate slots 158 having radial end walls 158a. The slots 158 are in the end surface 80 of the isolation plate valve member which is adjacent the rotatable plate valve member 56. The slots 158 form part of the spring centering mechanism described more fully hereinafter.

Figure 7:
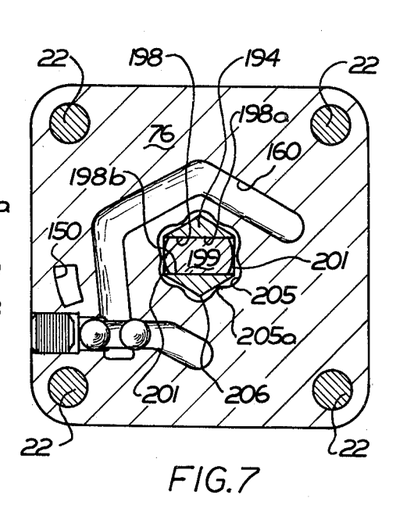
FIG. 7 is a sectional view of the isolation plate valve member of the controller of FIG. 2, taken along the line 7—7 of FIG. 2.

As seen in FIGS. 5 and 7 the inlet windows 140, 142 in the isolation plate valve member 70 extend through plates 72, 74 and communicate with a slot 160 in the intermediate plate 76. This communicates the inlet windows 140, 142 with each other.

Figure 12:
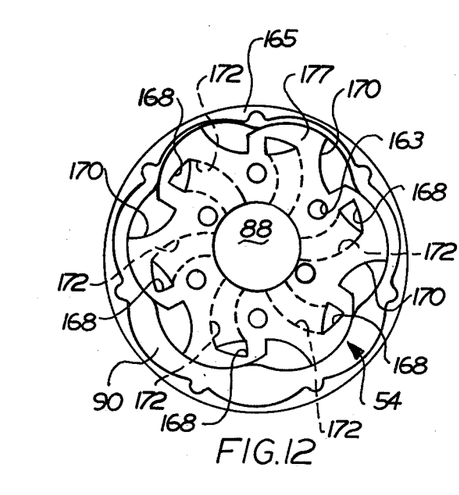
FIG. 12 is a view of one side of the commutator valve for controlling flow to and from the fluid pockets of the metering section of the controller of FIG. 2, taken along the line 12—12 of FIG. 2.

The commutation valve 54 shown in FIGS. 2 and 12 includes plate valve structure including a pair of plates 162, 164 bonded together by copper brazing and disposed within the valve ring 165. The plates 162, 164 are coupled to the inner gerotor gear member 46 for movement therewith by means of a series of pins 166 disposed in respective slots 163, 167 in the communication valve and the inner gear member.

The drive plate 25 which is fixed to the input shaft 24, is disposed adjacent one side of the pockets formed by the gerotor gearset to seal the pockets against leakage therefrom. One end surface 177 of the commutation plate valve structure is disposed adjacent the other side of the gearset and communicates fluid to and from the pockets from that side. A pressure plate 178 adjacent the other end surface 179 of the commutation valve structure is clamped to the outer gerotor gear member 44 and the drive plate 25 by a series of bolts 180. This construction maintains a uniform and relatively small clearance between drive plate 25 and the commutation plate valve structure regardless of pressures in the fluid pockets.

The commutation valve 54 includes pairs of fluid openings 168, 170 (FIG. 12) which are adjacent the fluid pockets formed by the gearset. Fluid passages 172 connect the fluid openings 168 with a central opening forming part of the chamber 88. The openings 170 communicate directly with the outer periphery of the commutation valve which defines part of the chamber 90.

During a steering maneuver, rotation of the steering wheel 14 rotates the drive plate 25 and the outer gerotor gear 44. Torque tranmitted between the teeth of the gerotor gear members causes the inner gerotor gear member 46 to rotate slightly to rotate the valve member 56 away from the neutral condition and to an operating condition. When the valve member 56 is in an operating condition, one of the chambers 88, 90 is communicated with the inlet port 26 and the other chamber is communicated with one of the cylinder ports. The relative orbital and rotational movement of the gear members 44, 46 valves the openings 168, 170 in the commutation valve such that whichever of chambers 88, 90 is connected with the inlet port 26 communicates inlet fluid with the expanding pockets of the metering mechanism, and the other chamber, which is connected with the cylinder port, receives metered fluid from the contracting pockets. Such commutation is in accordance with the principles disclosed in U.s. Pat. No. 3,598,509.

Figures 8, 9, 10, 14:
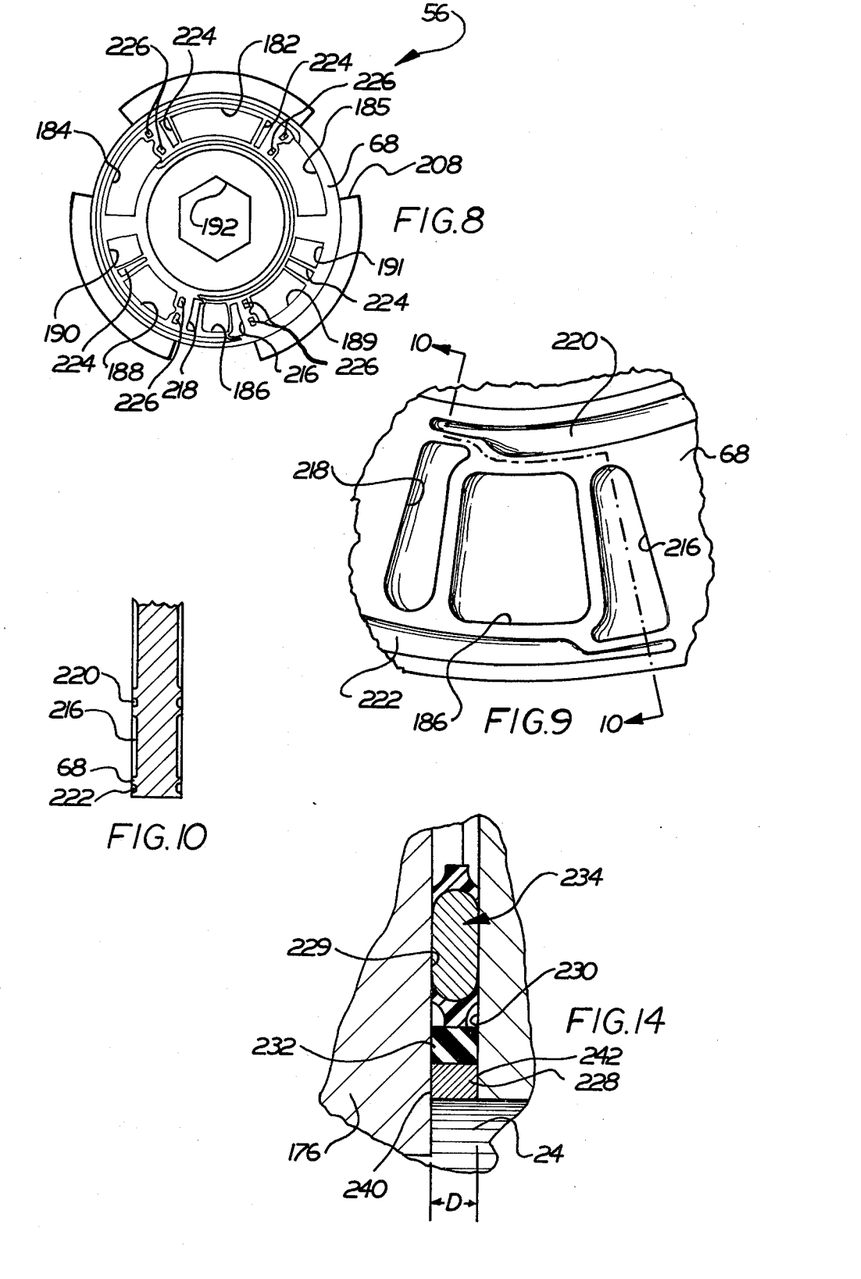
FIG. 8 is a view of one end surface of a movable plate valve member forming part of the controller of FIG. 2.
FIG. 9 is an enlarged view of an area of the plate valve member of FIG. 8.
FIG. 10 is a sectional view of FIG. 9, taken along the line 10—10 of FIG. 9.
FIG. 14 is an enlarged view of an input shaft seal embodied in the controller of FIG. 2.

The rotatable plate valve member 56 includes a series of arcuate openings extending axially therethrough and forming windows in both end surfaces 68, 82 of the plate valve member. As seen in FIG. 8 the arcuate openings include an auxiliary opening 182, and a pair of inlet openings 184, 185 on each side thereof. The arcuate openings further include a return opening 186, a pair of cylinder openings 188, 189, and a pair of metering openings 190, 191.

Figure 15:
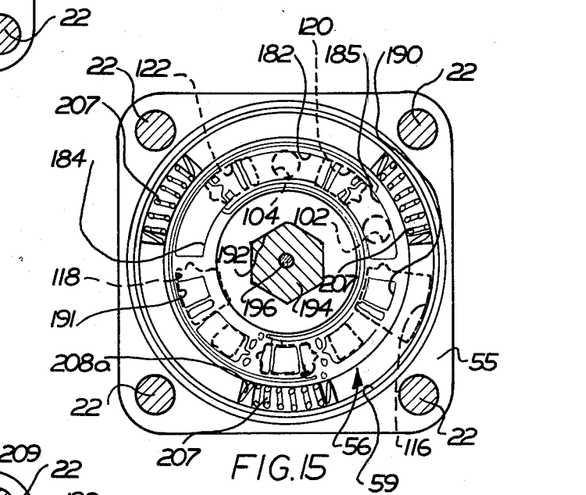
FIGS. 15 and 16 are views of opposite sides of the movable plate valve member of the controller of FIG. 2, taken along the lines 15—15 and 16—16, respectively of FIG. 2, with the fluid passages in the face of the adjacent fixed plate valve member superimposed thereon.

The plate valve member 56 also includes a hexagonal shaped central opening 192. A hexagonal block 194 is shaped to fit snugly in the hexagonal opening 192 (FIGS. 2, 15, 16) so that the plate valve meber 56 rotates therewith. A pin 196 is rotatably journaled in the hexagonal block 194 and also in the fixed manifold plate valve member 58.

The hexagonal block 194 includes a slot 198 of generally rectangular cross section (FIG. 7). The wobble shaft 84 has an end portion 199 which extends into the slot 198 and couples the block 194 with the inner gerotor gear 46 for joint rotation while allowing the wobble shaft to rock and to slide in the slot 198 in order to follow the orbiting movement of the inner gerotor gear. The end portion 199 of the wobble shaft includes side surfaces 201 (FIG. 7) which are segments of a spherical generated profile, and upper and lower segments each of which comprises a pair of converging flat surfaces 203 joined by a slightly curved surface 203a (FIG. 2). With this configuration, the end portion 199 can rock and slide axially in the slot 198 to allow the wobble shaft to follow the orbiting movement of the inner gerotor gear member 46. The end portion 199 will, however, act upon upper and lower surfaces 198a, 198b of the the slot 198 to rotate the hexagonal block 194 and thereby the plate valve member 56 jointly with the wobble shaft 84 (see FIG. 7).

The inner gear member 46 also includes a slot 200. An end portion 204 at the other end of the wobble shaft 84 is shaped similarly to the end portion 199, and extends into the slot 200. The engagement of end portion 204 with the slot 200 allows the wobble shaft to rock and slide axially in the slot 200 as the inner gear member 46 orbits, but couples the wobble shaft with the gear member 46 for joint rotation. Thus, the engagement of the end portions 199, 204 of the wobble shaft 84 with the slots 198, 200 couples the inner gear member 46 and the hexagonal block 194 for joint rotation, and allows the wobble shaft 84 to pivot relative to the hexagonal block 194 and the inner gear member 46 as the inner gear member rotates and orbits.

The range of rotation of the inner gear member 46 and the plate valve member 56 is limited. As seen in FIG. 7 the central opening 205 in the isolation plate valve member 70 forms a series of stops 205a. The stops 205a cooperate with the corners 206 of the hexagonal block 194 to limit the range of rotation of the hexagonal block and the plate valve member 56. Thus, they limit the range of rotation of the inner gerotor gear member 46.

When the input shaft 24 is rotated to effect a steering maneuver, it rotates the outer gerotor gear member 44. Rotation of the outer gerotor gear member 44 causes the inner gear member 46 to initially rotate. The plate valve member 56 rotates with the gerotor gear member 46 to place the plate valve member 56 in an operating condition. If the gerotor gear member 46 and the plate valve member 56 are rotated to their extreme position, continued rotation of the outer gerotor gear member 44 with the input shaft thereafter results in only orbiting movement of the inner gerotor gear member 46. The board principles and advantages of a controller in which torque is transmitted through a gerotor gearset to a valve member whose range of rotation from neutral is limited is disclosed in U.S. Pat. No. 3,895,888.

The spring centering mechanism exerts a centering force on plate valve member 56 to bias the plate valve member 56 to the neutral condition. During a steering maneuver the centering force must be overcome in order to rotate the plate valve member 56 away from the neutral condition and to an operating condition. The spring centering mechanism returns the plate valve member 56 to the neutral condition when the steering effort ceases.

The plate valve member 56 includes three arcuate slots 208 which are aligned with the arcuate slots 132, 158 in the manifold and isolation plate valve members when the plate valve members are in neutral. Each of the arcuate slots 208 includes radial end walls 208a. As set forth above, each of the arcuate slots 132, 158 in the fixed plate valve members have respective end walls 132a, and 158a.

Figure 13:
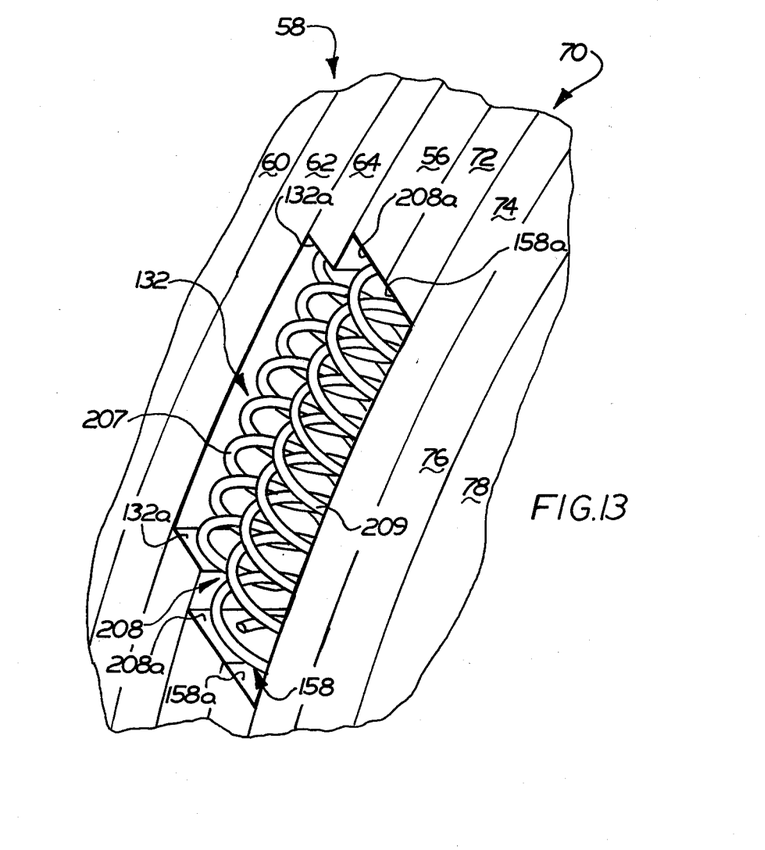
FIG. 13 is an enlarged perspective view of a spring centering mechanism embodied in the controller of FIG. 2.

A pair of helical springs 207, 209 are disposed partially in each slot 208 in the rotatable plate valve member 56 (FIG. 13). The helical spring 207 is also disposed in the slot 132 in the manifold plate valve member 58. The helical spring 209 is also disposed in the aligned slot 158 in the fixed isolation plate valve member 70. Both helical springs 207, 209 are compressed against the respective radial end walls 132a, 158a of the slots 132, 158 in the fixed plate valve members. Springs 207, 209 have oppositely directed helices which maintains the springs in abutting relation and prevents their coils from interfering with each other.

The spring 209 is compressed between the radial end walls 208a of the plate valve member 56 and the end walls 158a of the plate valve member 70. The arcuate slot 208 in plate valve member 56 and the arcuate slot 158 in the isolation plate valve member 70 are equal in length. The radial end walls 158a, 208a of the slots are also aligned with each other so that the spring 209 is also compressed between radial walls 208a of slot 208 of plate valve member 56 as well as between radial walls 158a of slot 158 in isolation plate member 70. The spring 209 thus exerts a centering force on the plate valve member 56 biasing the plate valve member 56 to the neutral condition. The centering force must be overcome to move the plate valve member 56 away from neutral. The centering spring force preloads the plate valve member in neutral and also provides the steering wheel operator with a "feel" of the neutral valve position since the preload force must be overcome prior to initiating valve movement or a steering maneuver.

The arcuate slot 132 in manifold plate valve member 58 is shorter than the slots 158, 208. Its radial end walls 132a are equidistantly spaced from the end walls 158a, 208a of the slots 158, 208. Spring 207, which is compressed against the end walls 132a of slot 132, does not exert a centering force on plate valve member 56 when plate valve member 56 is in the neutral condition.

When plate valve member 56 is rotated away from the neutral condition the spring 209 is further compressed between one of the end walls 208a in plate valve member 56 and the opposite end wall 158a in the fixed isolation plate valve member 70. This increases the force in spring 209 urging the plate valve member 56 back to its centered position. When the plate valve member 56 rotates away from neutral by a predetermined amount it also compresses the spring 207 between the radial end wall 208a and the opposite end wall 132a in the slot 132 in the fixed manifold plate valve member 58. This substantially increases the force urging the plate valve member 56 back to its neutral condition.

In the preferred embodiment it has been found desirable that the spring centering force provide lighter resistance to movement of the plate valve member 56 away from neutral over approximately half its potential path of travel away from neutral, and that the spring centering force increase significantly at about half the path of travel of the plate valve member 56 away from neutral. This is accomplished by designing the size of slots 132, 158 and 208 such that the spring 207 is not compressed until the plate valve member 56 rotates away from neutral by approximately half its potential length of travel. This provides a good correlation between the steering effort required to rotate the plate valve member 56 and the fluid pressure required at the steering motor.

As should be clear from the foregoing, each spring 207, 209 acts individually to resist rotation of the plate valve member 56 away from neutral. The point at which spring 207 is compressed further by rotation of plate valve member 56 away from neutral, and the force with which it acts, depends primarily upon the respective lengths of the aligned slots 132, 158, 208, and also the load versus deflection rate of the springs 207, 209. By varying the size of the slots, or the spring coefficients of springs 207, 209, the point at which spring 207 acts, and the force with which it acts can be varied.

In addition, the foregoing principles can be used to apply additional amounts of spring force at discrete increments of movement of the plate valve member 56 away from neutral. For example, in the disclosed embodiment three sets of aligned slots 132, 158, 208 and cooperating springs 207, 209 are shown. Only one set need have the construction of slots 158, 208 and spring 209 to provide the spring centering force on the plate valve member 56 in the neutral condition. The remaining five springs and their respective slots can be similar to the spring 207 and the slots 132, 208 in that the springs begin to act only at a predetermined amount of rotation of the plate valve member 56 away from the neutral condition.

Turning now to the actual flow of fluid in the controller, in neutral all flow is directed to the auxiliary port 36, and flow is isolated from the metering section 18. In neutral, inlet fluid communicates with the arcuate slots 184, 185 (see FIGS. 15, 16) in the movable plate valve member 56. The arcuate slots 184, 185 are overlapped by windows 136, 138 in the isolation plate valve member 70 and windows 120, 122 in the manifold plate valve member 58. The windows 120, 122, 136 and 138 also overlap auxiliary slot 182 in the movable plate valve member 56. Slot 182 communicates with the auxiliary passage 104 in the manifold plate valve member. Thus, a flow of fluid is directed to the auxiliary passage 104. This flow is directed to the auxiliary port 36. The plate valve members block the metering windows 148, 154 in the isolation plate valve member from communicating with the chambers 88, 90. Thus, in neutral all flow from the inlet port is directed to the auxiliary port, and fluid is isolated from the metering section 18.

Figures 17, 19:
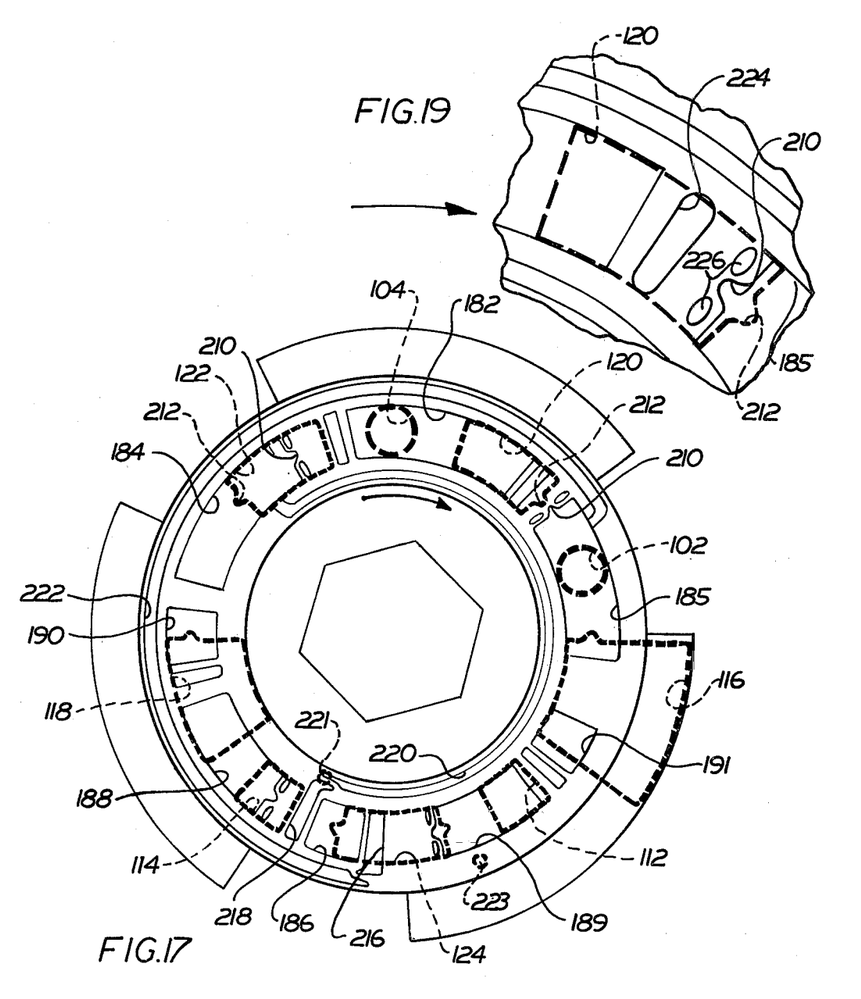
FIGS. 17 and 18 are enlarged representations of opposite sides of the movable plate valve member, with the flow passages in the faces of the adjacent fixed plate valve members superimposed thereon and showing the relative positions of the plate valve members when the movable plate valve member has been rotated in one direction to an operating condition in which the member cuts off all flow to the auxiliary motor.
FIG. 19 is an enlarged fragmentary view of a surface portion of the movable plate valve member showing how flow is gradually restricted to the auxiliary motor before reaching a position where flow to the auxiliary motor is cut off.
Figure 18:
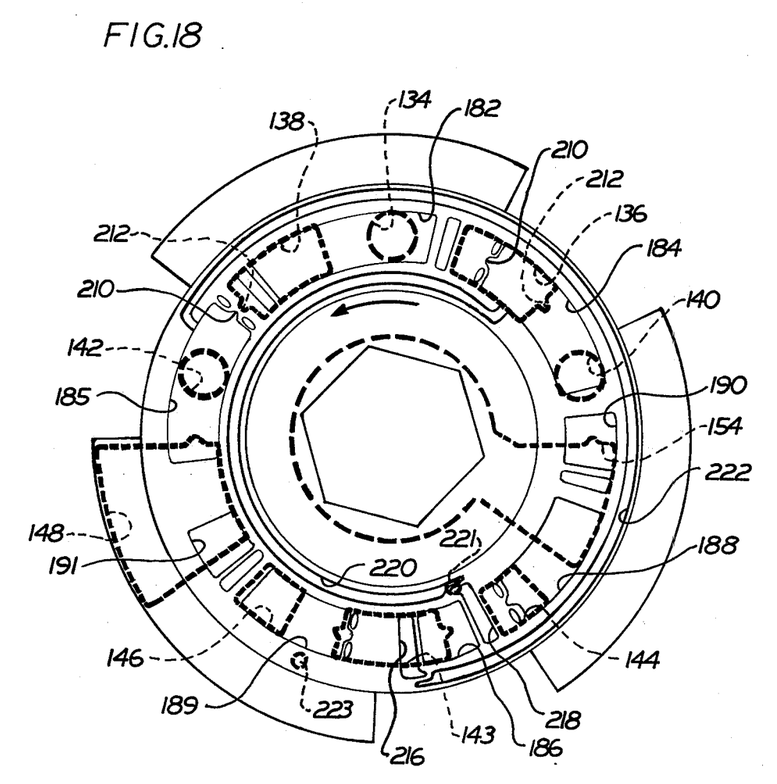

Upon a predetermined amount of movement of the plate valve member 56 in one direction away from neutral, flow across slots 184, 185 to the auxiliary window 182 is blocked (FIGS. 17, 18). Inlet fluid is communicated across slot 185 to one metering window 148 in the isolation plate valve member 70. The inlet fluid is thereby directed to the chamber 90. The commutation valve 54 directs fluid from chamber 90 to the expanding pockets of the metering mechanism, and fluid from the contracting pockets of the metering mechanism is directed to the other chamber 88. The chamber 88 communicates with the metering window 154 in the isolation plate through the central openings (e.g., 156, 205) in the isolation plate valve member 70.

The metered fluid communicated with the metering window 154 is directed across slot 188 in plate valve member 56 to the cylinder window 144 in the manifold plate valve member 58. From the cylinder window 144 it is communicated with one of the cylinder ports. Flow returning from the other cylinder port communicates across windows 146, 143 in the manifold plate valve member 70 and slots 186, 189 in the movable plate valve member 56. Such flow is also communicated with return window 124 in the manifold plate valve member 58 and to the return port.

As the plate valve member 56 moves away from the neutral condition, but before reaching the position of FIGS. 17, 18, there is a gradually increasing restriction of flow from the inlet to the auxiliary port. This occurs because of U-shaped grooves 210 in slots 184, 185 of the movable plate valve member 56, and cooperating oppositely directed U-shaped grooves 212 in the windows 120, 122 and 136, 138 of the fixed plate valve members (see FIGS. 17-19). Certain of those U-shaped grooves move toward each other as the plate valve member 56 moves initially away from neutral (FIG. 19) and are ultimately overlapped to increase restriction of flow from the inlet port to the auxiliary port with increasing movement of the plate valve members away from neutral. Rotation of the plate valve members to an extreme position (FIGS. 17, 18) moves those U-shaped grooves past the overlapped relation, thereby cutting off all flow from the inlet port to the auxiliary port.

Figure 16:
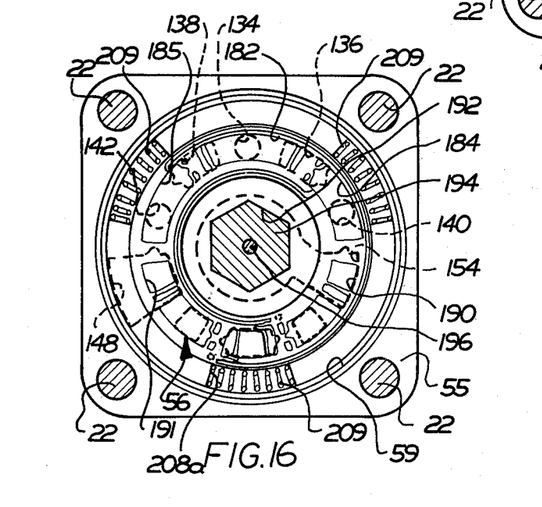

Rotation of the plate valve member 56 in the opposite direction from that shown in FIGS. 16 and 17 results in a flow pattern with similar characteristics but different directions. That is, flow is across the metering window 154 in the isolation plate to chamber 88, and metered flow is directed through chamber 90 across the metering window 148 in the isolation plate valve member 70, and through window 146 in the manifold plate valve member 58 to the other cylinder port. Return flow is directed from the opposite cylinder port to the return window 124 in the manifold plate valve member 58 and thereby to the return port.

As noted above, a particular characteristic of the controller of the invention resides in the manner in which pressure dams are formed to block leakage of metered fluid to return when the controller is in an operating condition.

In the present invention, the movable plate valve member 56 is constructed such that when the controller is placed in an operating condition, a pressure dam is created to block leakage of metered fluid flow to return. The pressure dam is created in one of a pair of pressure dam grooves 216, 218 formed in each end surface 68, 82 of the plate valve member 56, and on opposite sides of the return window 186. In neutral, the pressure dam grooves 216, 218 are at return pressure because they face the return windows 124, 143 in the manifold and isolation plate valve members 58, 70, respectively. However, the plate valve members block flow from the inlet port to the return port, so there is no flow from the inlet port through the pressure dam grooves when the plate valves are in neutral.

Each surface of the plate valve member 56 includes a pair of inner and outer arcuate pressure balance grooves 220, 222 respectively. These pressure balance grooves are in continuous communication with the inlet windows 184, 185 in the plate valve member 56. Thus, they are continuously at inlet pressure.

When the plate valve member 56 rotates to an operating position, the pressure dam grooves 216 or 218 in both end faces of the plate valve member 56 are disposed between slots 188 and 186 in the plate valve member 56 which are, respectively, at metering pressure and at return pressure. In the position shown in FIGS. 17 and 18 pressure dam grooves 218 are in that position. Initially, as the plate valve member 56 moves to an operating condition those pressure dam grooves 218 each move into facing relation with the adjacent end faces of the manifold and isolation plate valves to form a static pocket of fluid. A groove 221 in the adjacent end surface of each of the manifold plate valve 58 and the isolation plate valve communicates high pressure fluid from the inner pressure balance groove 220 to each of the pressure dam grooves 218. This brings the fluid pressure in the pressure dam grooves 218 essentially to inlet pressure. Therefore, there is very little pressure differential between those pressure dam grooves and the metered fluid pressure in the adjacent metering slot 188, and this blocks leakage of fluid from the metering slot 188 and to the return slot 186.

Upon rotation of the valve member 56 in an opposite direction away from neutral, pressure dams are created in the other pressure dam grooves 216 in each end face of the plate valve member 56 to block leakage of metered fluid to return. Inlet pressure in the outer pressure balance grooves 222 is communicated to the pressure dam grooves 216 by means of grooves 223 in the adjacent end surfaces of the manifold plate valve 58 and the isolation plate valve 70.

The pressure dam grooves 216, 218, the arcuate pressure balance grooves 220, 222 form part of a series of grooves which also pressure balance the opposite end faces 68, 82 of rotatable plate valve member 56. A series of long radial pressure balance grooves 224 and short radial pressure balance grooves 226 minimize unbalance pressures from occurring on the plate valve member 56.

A further feature of the invention resides in the arrangement which seals the input shaft 24 against leakage. As shown in FIGS. 2 and 14 a surface 229 on drive plate 25 is in facing relation with an interior wall 230 of the end plate 20 which surrounds the input shaft 24. A needle bearing 234 spaces the surface 229 from the interior wall 230 by a predetermined minimum amount D (FIG. 14). The needle bearing 234 also takes up axial forces between the facing surfaces.

A sealing ring 232 of resilient compressible material surrounds the input shaft 24 inwardly of the needle bearing 234. The sealing ring 232 has an uncompressed thickness greater than the minimum distance D set by the needle bearing 234 and is compressed between the surface 229 and the interior wall 230 of end plate 20. A metal spacer ring 228 between sealing ring 232 and the input shaft 24 is dimensioned so that its axial end faces 240, 242 are closely spaced from the facing surfaces 229, 230 in order to prevent radial extrusion of the sealing ring 232 due to fluid pressure. High pressure fluid (either metered or inlet) communicating with the chamber 90 which surrounds the commutator valve 54 is thus sealed against leakage around the input shaft. The seal arrangement is simple to construct and assemble, and yet is effective to seal the controller against leakage about the input shaft.

As seen in FIG. 2, the end plates 19, 20, the outer periphery of the plate valves 55, 58 and 70 and the tubular shell 21 form the outer periphery of the controller. The unique seal arrangement described above seals the input shaft 24 against leakage of high pressure fluid. The controller is also sealed against leakage by means of static seals 57 between ring 55 and the adjacent fixed plate valves 58, 70, and static seal 99 between manifold plate valve 58 and the end plate 19. As seen in FIG. 2, additional sealing is provided by static seals 244 at the ends of the tubular shell 21 adjacent the isolation plate 70 and end plate 20.

The fact that the valve section 17 and the tubular shell are bolted between the end plates 19, 20 further helps to minimize the likelihood of leakage because those elements are forced tightly against each other. The high pressure fluid directed to chamber 131 minimizes internal leakage because it provides an equal area on either side of the manifold plate exposed to high pressure and the manifold plate valve therefore remains flat.

In the construction of the various elements of the controller, the gear members 44, 46 are preferably formed by known powder metal techniques. The various plate members which are used to form the controller are all preferably stamped out of sheet steel stock.

The tubular shell 21 is the only housing element which is preferably cast of iron. However, as clearly seen from FIG. 2, this element is fairly thin, and is relatively simple in shape in comparison to the bulkier, heavier and more complicated types of housing elements which are usually used in forming fluid controllers. Moreover, it is contemplated that even this element may be made of powdered metal.

Thus, according to the foregoing description, the applicant has provided what is believed to be a compact, simply made, and yet efficient controller for controlling flow from a source.

What is claimed is:

1. A controller for controlling flow from a source to a motor, said controller having an inlet port for connection to the source and a working port for connection to the motor, said controller further including a pair of spaced apart end plates, a metering section and a control valve section disposed between said spaced apart end plates, an input shaft extending through one of said end plates and adapted to provide an input signal for operating said metering section and said control valve section, said control valve section comprising a plurality of adjacent plate valve members fixed between said spaced apart end plates, said plurality of fixed plate valve members defining a fluid chamber in fluid communication with said inlet port, the outer periphery of said plurality of fixed plate valve members, the outer periphery of a part of said metering section and the outer periphery of said end plates forming a part of the outer periphery of said controller, a movable plate valve member disposed in said fluid chamber, said movable plate valve member being movable in response to the input signal from a neutral condition to an operating condition for directing fluid from said inlet port to said metering section and from said metering section to said working port to direct metered flow to the motor.

2. A controller as defined in claim 1 wherein said control valve section is disposed adjacent one of said end plates, said metering section comprising a metering mechanism forming a series of expansible and contractable fluid pockets, a cylindrical tubular shell encircling said mechanism, said cylindrical tubular shell having a first end adjacent said plurality of fixed plates and a second end adjacent the other one of said end plates, means for clamping said plurality of adjacent plates and said tubular shell between said end plates, the outer surface of said tubular shell defining a part of the outer periphery of said controller.

3. A controller as defined in claim 2 wherein said metering mechanism comprises a gear set including a pair of relatively rotatable and orbital gerotor gear members and having intermeshing teeth defining said fluid pockets, a drive plate disposed inside of said tubular shell, said drive plate having a cylindrical outer surface supported for rotation about a central axis by the cylindrical inner surface of said tubular shell, said input shaft extending through said other one of said end plates and having an end portion coupled with said drive plate for joint rotation about said central axis, one of said gerotor gear members being fixedly connected with said drive plate so that rotation of said input shaft effects rotation of said one gerotor gear member, the other gerotor gear member being supported such that when said one gerotor gear member is rotated said other gerotor gear member can orbit about said central axis and rotate to a limited extent, means coupling said other gerotor gear member with said movable plate valve member so as to rotate said movable plate valve member jointly with said other gerotor gear member while allowing said other gerotor gear member to orbit about said central axis.

4. A controller as defined in claim 3 wherein said one of said end plates includes the inlet port, said one of said end plates further including a pair of working ports for connection to opposite sides of the motor and an auxiliary port for connection to an auxiliary motor, said series of fixed plate valve members including a manifold plate valve member adjacent said one of said end plates, a valve ring disposed adjacent said manifold plate valve member and an isolation plate valve member disposed adjacent said valve ring, said fluid chamber being formed inside an opening in said valve ring and between said manifold plate valve member and said isolation plate valve member, said movable plate valve member being disposed in said chamber and having end surfaces in sliding, abutting relationship with corresponding end surfaces of said manifold plate valve member and said isolation plate valve member and defining therewith portions of fluid passages which direct all flow from said inlet port to said auxiliary port while blocking flow to said metering section when said plate valve members are in said neutral condition and which direct flow from said inlet port through said metering section to one of said working ports when said plate valve members are relatively moved away from said neutral condition to said operating condition.

5. A controller as defined in claim 4 wherein said drive plate is disposed adjacent one axial side of said gear set, said metering section further including a commutation valve for controlling fluid flow between said control valve section and the fluid pockets formed by said gear set and comprising a commutation plate valve disposed adjacent the other axial side of said gear set, means acting against said commutation plate valve and coupled with said one gerotor gear member and said drive plate for movement therewith, said last mentioned means urging both said drive plate and said commutation plate valve against their respective sides of said gear set to resist deflection of the drive plate and commutation plate valve due to pressures in the fluid pockets, a fluid pressure chamber disposed between said manifold plate and said one of said end plates, and means communicating said fluid pressure chamber with said inlet port so as to maintain said fluid pressure chamber at inlet pressure, said fluid pressure chamber exerting a force on said plate valve members to resist deflection thereof due to pressures in said valve section.

6. A controller as defined in any of claims 3, 4, or 5 wherein said drive plate extends radially with respect to said central axis and includes a surface which is spaced from and in facing relationship with an interior surface of the end plate through which said input shaft extends, thrust bearing means encircling said input shaft and disposed between the facing surfaces of said drive plate and said interior surface of said end plate, said thrust bearing means spacing said facing surfaces apart by a predetermined minimum distance and taking up axial forces therebetween, a sealing ring of resilient compressible material encircling said input shaft and disposed between said facing surfaces radially inwardly of said thrust bearing means, said sealing ring having an uncompressed axial thickness greater than the minimum axial spacing set by said thrust bearing means and being compressed between said facing surfaces of said drive plate and said end plate, a spacer ring encircling said input shaft and disposed between said sealing ring and said input shaft, said spacer ring having axial end surfaces closely spaced from each of said facing surfaces of said drive plate and said end plate and preventing radial extrusion of said sealing ring due to forces thereon.

7. A controller as defined in any of claims 1, 2, 3, 4, or 5 wherein said movable plate valve member is rotatable in opposite directions from the neutral condition to an operating condition, said fixed and movable plate valve members having respective arcuate slots which are aligned with each other when said movable plate valve member is in said neutral condition, each arcuate slot including a pair of radial end walls, first biasing means comprising a first helical spring disposed partially in an arcuate slot in said movable plate valve member and disposed partially in the aligned arcuate slot in one of said fixed plate valve members, said first helical spring being compressed between the radial end walls of said aligned arcuate slot in said one fixed plate valve member, second biasing means comprising a second helical spring disposed partially in an arcuate slot in the movable plate valve member and partially in the aligned arcuate slot in the other fixed plate valve member, said second helical spring being compressed between the radial end walls of said aligned arcuate slot in said other fixed plate valve member, said first helical spring also being in a compressed state between the radial end walls of its respective arcuate slot in said movable plate valve member to exert a centering force on said movable plate valve member biasing said movable plate valve member to said neutral condition, and each of said first and second helical springs being further compressed by a radial end wall of said movable plate valve member in response to a predetermined amount of rotation of said movable plate valve member in either direction away from said neutral condition.

8. A controller as defined in any of claims 1, 2, 3, 4, or 5 including a return port for communicating with a reservoir, said fixed and movable plate valve members cooperating to block flow from the inlet port to the metering section when in said neutral condition and cooperating to direct metered flow to the steering motor through said working port and return flow from the motor to the reservoir through said return port when in an operating condition, one of the abutting surfaces of said fixed and movable plate valve members including a pressure dam groove disposed so as to be positioned between a fluid passage at metered pressure and a fluid passage at return pressure when the plate valve members are in an operating condition, the abutting surfaces of said fixed and movable plate valve members cooperating to block flow from the inlet port through the pressure dam groove to the return port when said plate valve members are in said neutral condition, said pressure dam groove cooperating with the facing end surface of the adjacent plate valve member to form a static body of fluid therein when said plate valve members are moved to an operating condition, fluid passage means in the facing end surface of the adjacent plate valve member defining part of a fluid passage for communicating said pressure dam groove with said inlet port in response to movement of the plate valve members to an operating condition to bring the pressure in said pressure dam groove to inlet pressure.

9. A controller as set forth in claim 3 wherein a plate member fixed between said end plates is disposed adjacent said metering section, said means coupling said other gerotor member with said movable plate valve member including a block member extending through an opening in said plate member, said block member being coupled with said movable plate valve member for joint rotation, a wobble shaft disposed at an angle to said central axis, said wobble shaft having a first end coupled with said block member for joint rotation and a second end coupled with said other gerotor gear for joint rotation, the couplings between said first and second ends of said wobble shaft said block member and said other gerotor member transmitting rotary motion directly between said block member and said other gerotor gear while allowing said other gerotor gear to orbit relative to said central axis, spring means biasing said rotatable valve member to a neutral condition, said opening in said plate member including stop surfaces for engaging surfaces on said block member after a limited range of rotation of said block member to limit the range of rotation of said block member and said other gerotor gear member.

10. A controller for controlling fluid flow from a source to a motor, said controller having an inlet port for connection to the source, a return port for connection to a reservoir, and a pair of working ports for connection to opposite sides of the motor, said controller further including a metering section and a control valve comprising a pair of relatively rotatable plate valve members having facing end surfaces in sliding abutting relation with each other, said plate valve members having a neutral condition blocking flow from the inlet port to the metering section and being rotatable away from said neutral condition to an operating condition to form flow passages directing metered flow to the motor through one working port and return flow from the motor to the reservoir through the other working port, a pressure dam groove disposed in the facing end surface of one of said relatively rotatable plate valve members, said pressure dam groove communicating with said return port when said plate valve members are in said neutral condition and disposed so as to be positioned between flow passages at metered fluid pressure and flow passages at return pressure when the plate valve members are rotated to an operating condition, the abutting facing end surfaces of said relatively rotatable plate valve members cooperating to block flow from the inlet port through the pressure dam groove to the return port when the plate valve members are in the neutral condition and to form a static body of fluid in said pressure dam groove in response to movement of said plate valve members to an operating condition, and fluid passage means in the facing end surface of the other plate valve member defining part of a fluid passage communicating said static body of fluid in said pressure dam groove with said inlet port in response to movement of said plate valve members to said operating condition to bring the pressure in said pressure dam groove to inlet pressure in order to minimize leakage of metered fluid to the return port.

11. A controller for controlling fluid flow from a source to a primary motor and to an auxiliary motor, said controller comprising a metering section for metering fluid flow in response to an input signal and a control valve section for directing fluid flow to the auxiliary motor and to the primary motor in response to said input signal, said control valve section comprising a series of adjacent plate valve members, said series of plate valve members being biased to a neutral condition and being relatively movable away from said neutral condition to place said controller in an operating condition, means for effecting relative movement of said plate valve members in response to said input signal to position said plate valve members in said operating condition, said plate valve members defining fluid passages for directing all flow from the source to the auxiliary motor when said plate valve members are in said neutral condition, said plate valve members defining other fluid passages for directing a flow of fluid from the source to said metering section and from said metering section to the primary motor when said plate valve members are in an operating condition, and said plate valve members having relatively movable surfaces which cooperate to restrict flow to the auxiliary motor as a function of the extent of the relative movement of the plate valve members away from said neutral condition.

12. A controller as defined in claim 11, including an inlet port for connection to the source, at least one working port for connection to the primary motor and an auxiliary port for connection to the auxiliary motor, said series of plate valve members including a pair of plate valve members fixed in said housing and a rotatable plate valve member supported for rotation about a central axis thereof and disposed between said pair of fixed plate valve members, the fixed and rotatable plate valve members having end surfaces in sliding, abutting relationship and defining portions of the fluid passages which are valved by relative movement therebetween.

13. A controller as defined in claim 12 including a pair of working ports for connection to opposite sides of the primary motor, said metering section including a gerotor gear set comprising a pair of relatively rotatable and orbital gear members defining expansible and contractable fluid pockets in response to relative rotational and orbital movement thereof, a commutation valve for controlling fluid flow between a pair of fluid chambers and the fluid pockets in timed relation to the relative orbital and rotational movement of said gear members, one of said fixed plate valve members being disposed in fluid communication with both of said fluid chambers, said end surfaces of said fixed and rotatable plate valve members cooperating to define parts of fluid passages directing flow from said inlet port to said auxiliary port and blocking communication of said inlet port with either of said fluid chambers when said plate valve members are in the neutral condition, said end surfaces of said fixed and rotatable plate valve members cooperating to define parts of fluid passages communicating said inlet port with one of said pair of fluid chambers and communicating said other of said pair of fluid chambers with one of said working ports when said plate valve members are moved away from the neutral condition into an operating condition, said plate valve members gradually restricting flow from said inlet port to said auxiliary port as a function of the amount of movement of the plate valve members away from said neutral condition.

14. A controller for controlling fluid flow from a source to a motor, said controller comprising a series of relatively rotatable plate valve members for controlling flow to said hydraulic motor, said relatively rotatable plate valve members having a neutral condition and being relatively rotatable away from said neutral condition to an operating condition, first biasing means exerting a centering force on said plate valve members when said plate valve members are in said neutral condition and which force must be overcome to rotate said plate valve members away from said neutral condition, second biasing means for exerting an additional amount of centering force on said plate valve members for biasing said plate valve members to said neutral condition in response to a predetermined amount of relative rotation of said plate valve members away from said neutral condition.

15. A controller as defined in claim 14 wherein said relatively rotatable plate valve members comprise a pair of plate valve members fixed in said controller and a rotatable plate valve member disposed therebetween, said rotatable plate valve member being supported for rotation about a central axis thereof, means for transmitting torque to said rotatable plate valve member to rotate said rotatable plate valve member in opposite directions away from said neutral condition, said fixed and rotatable plate valve members having respective arcuate slots which are aligned with each other when said plate valve members are in said neutral condition, each arcuate slot including a pair of radial end walls, said first biasing means comprising a first helical spring disposed partially in an arcuate slot in said movable plate valve and disposed partially an aligned arcuate slot in one of said fixed plate valve members, said first helical spring being compressed between the radial end walls of said aligned arcuate slot in one fixed plate valve member, said second biasing means comprising a second helical spring disposed partially in an arcuate slot in the movable plate valve member and partially in an aligned arcuate slot in the other fixed plate valve member, said second helical spring being compressed between the radial end walls of said aligned arcuate slot in said other fixed plate valve member, said first helical spring also being in a compressed state between the radial end walls of its respective arcuate slot in said movable plate valve member when said movable plate valve member is in the neutral condition to exert said centering force on said movable plate valve member in said neutral condition, and each of said first and second helical springs being further compressed by a radial end wall of said rotatable plate valve member in response to a predetermined amount of rotation of said rotatable plate valve member in either direction away from said neutral condition to increase the centering force on said movable plate valve member.

16. A controller as defined in claim 15 wherein a single arcuate slot in said movable plate valve member is aligned with arcuate slots in each of said fixed plate valve members, each of said first and second helical springs being disposed partially in said single arcuate slot and partially in a respective one of said aligned arcuate slots in said fixed plate valve members, said first and second helical springs having oppositely directed helices.

17. A controller as defined in claim 16 including an additional pair of arcuate slots in said rotatable plate valve member and one of said fixed plate valve members which are aligned when said rotatable plate valve member is in said neutral condition, said additional arcuate slots each having respective radial end walls, a third helical spring disposed partially in each of said additional aligned arcuate slots, said third helical spring being compressed between the radial end walls of the additional arcuate slot in said one of said fixed plate valve members and being further compressed by one of the radial end walls of said additional arcuate slot in said rotatable plate valve member in response to a predetermined amount of rotation of said rotatable plate valve member in either direction away from said neutral condition.

* * * * *